(12) United States Patent
Murrow et al.

(10) Patent No.: US 11,306,863 B2
(45) Date of Patent: Apr. 19, 2022

(54) HEAD ASSEMBLY FOR A TRIPOD

(71) Applicant: THE VITEC GROUP PLC, Kingston upon Thames (GB)

(72) Inventors: Andrew Derek Murrow, Bury St. Edmunds (GB); Jolyon Torbitt, Bury St. Edmunds (GB); Simon Hall, Stowmarket (GB); James Guest, Bury St. Edmunds (GB); Joji Osborne Kawaguchi, Bury St. Edmunds (GB)

(73) Assignee: THE VITEC GROUP PLC, Kingston Upon Thames (GB)

( * ) Notice: Subject to any disclaimer, the term of this patent is extended or adjusted under 35 U.S.C. 154(b) by 0 days.

(21) Appl. No.: 17/419,282

(22) PCT Filed: Mar. 13, 2020

(86) PCT No.: PCT/GB2020/050649
§ 371 (c)(1),
(2) Date: Jun. 28, 2021

(87) PCT Pub. No.: WO2020/201695
PCT Pub. Date: Oct. 8, 2020

(65) Prior Publication Data
US 2022/0018492 A1 Jan. 20, 2022

(30) Foreign Application Priority Data
Apr. 5, 2019 (GB) ...................................... 1904849

(51) Int. Cl.
*F16M 11/02* (2006.01)
*F16M 11/16* (2006.01)
(Continued)

(52) U.S. Cl.
CPC ........... *F16M 11/16* (2013.01); *F16M 11/126* (2013.01); *F16M 11/14* (2013.01); *F16M 2200/022* (2013.01)

(58) Field of Classification Search
CPC . F16M 11/16; F16M 11/126; F16M 2200/022
(Continued)

(56) References Cited

U.S. PATENT DOCUMENTS

| | | | |
|---|---|---|---|
| 1,210,411 A | | 1/1917 | Bryhan |
| 2,375,690 A | * | 5/1945 | Reeves ................ F16M 11/126 248/183.3 |

(Continued)

FOREIGN PATENT DOCUMENTS

| | | |
|---|---|---|
| CN | 206398300 | 5/2017 |
| DE | 31 05 989 A1 | 8/1982 |

(Continued)

*Primary Examiner* — Todd M Epps
(74) *Attorney, Agent, or Firm* — Troutman Pepper Hamilton Sanders LLP

(57) ABSTRACT

A head assembly for a tripod comprising a head portion and a bowl portion releasably connectable to one another, the bowl portion having a clamp stud and the head portion having a stud catch mechanism, wherein the stud catch mechanism is adapted to be releasably connectable to the clamp stud, and wherein the head assembly further comprises an adjustment mechanism adapted to adjust the connection between the head portion and the bowl portion when the head portion and bowl portion are connected to one another.

22 Claims, 5 Drawing Sheets

(51) Int. Cl.
*F16M 11/12* (2006.01)
*F16M 11/14* (2006.01)

(58) Field of Classification Search
USPC .................. 248/169, 177.1, 187.1, 176.1
See application file for complete search history.

(56) References Cited

U.S. PATENT DOCUMENTS 2,572,468 A * 10/1951 Gibson .................. F16M 11/14
248/181.2
3,797,241 A * 3/1974 Kern .......................... F01N 3/26
60/305
8,550,442 B2 * 10/2013 Philippe ............... B23Q 1/0063
269/296

FOREIGN PATENT DOCUMENTS

| DE | 3105989 A1 | 8/1982 |
| EP | 2787270 A1 | 10/2014 |
| GB | 2549171 A | 10/2017 |
| KR | 2014 0043619 A | 4/2014 |
| WO | WO 03/008855 A1 | 1/2003 |
| WO | 2017081502 A1 | 5/2017 |
| WO | WO 2018/047207 A1 | 3/2018 |

* cited by examiner

HEAD ASSEMBLY FOR A TRIPOD

CROSS REFERENCE TO RELATED APPLICATIONS

This application is a national phase filing under 35 U.S.C. § 371 of International Patent Application No. PCT/GB2020/050649, filed Mar. 13, 2020, which claims priority to Great Britain Application No. 1904849.5 filed Apr. 5, 2019 which is incorporated herein by reference in its entirety.

FIELD OF THE INVENTION

The present inventive concept relates to a head assembly for a tripod. Tripods are often used to support cameras and the like.

BACKGROUND TO THE INVENTION

Tripods are widely used to support video cameras, and the camera is generally mounted onto a head which is in turn fixed onto the tripod. The head provides the articulation to enable the camera to be moved by the camera operator in pan and in tilt, and it generally also provides a means of counter-balancing the camera and applying variable drag to dampen the movements about each axis. The head generally also provides pan and tilt brakes to enable the camera to be locked in a particular position for safety and for fixed shots.

When the operator is panning the camera, they generally want the pan axis to be truly vertical: otherwise the camera will tend to rotate of its own accord towards the lowest point, and any panning shots will not follow a horizontal horizon. However, the top of the tripod is affected by the position, length and angle of each of the legs and is rarely horizontal. Instead its orientation tends to change every time the tripod is moved or adjusted. Although it is theoretically possible to adjust the tripod so that its top is horizontal, in practice this is very difficult to achieve particularly when there is a heavy camera and head mounted on top.

As a result it is common practice to add a separate levelling means between the tripod and the head, so that the tripod may be adjusted for height and security and then the head adjusted separately to be level. When the head is level then the pan axis is vertical. The most common means of providing this levelling means is through the use of a bowl clamp as the interface between the head and the tripod. The head is generally provided with a level bubble to indicate when it is level.

A bowl clamp generally comprises four parts: a part at the very bottom of the head with a substantially hemispherical outer surface and a stud which protrudes in a downward direction; a bowl-like part at the top of the tripod in the form of a hemispherical shell slightly larger in inside radius than the bottom of the head; a ring at the top of the hemispherical shell which has the same inner radius as the outer radius of the bottom of the head; and a clamping nut which screws onto the stud in the bottom of the head and with a part-spherical washer that bears on the outer surface of the hemispherical shell. In use the head rests on the ring at the top of the bowl on the top of the tripod with the stud at the bottom of the head passing through an aperture in the bottom of bowl; the clamping nut is then screwed onto the protruding stud from underneath the bowl. Whilst the nut is loose, the head can be moved relative to the ring that its bottom part is resting on to level it. If the clamping nut is tightened then its washer bears on the bottom of the bowl shell to draw the head down onto the ring, and the friction between the head and the ring and the washer and the bottom of the bowl lock the head in position. A user can therefore level the head by loosening the clamping nut, repositioning the head and then re-tightening the nut.

An example of this arrangement can be seen in GB2535682A, FIG. 2; it can also be seen in cross-section with a lever operated clamp in EP2787270, FIG. 5.

The bowl clamp arrangement has proven simple and robust but does suffer from some drawbacks in use. It relies on the screwing and unscrewing of the clamp nut which is situated underneath the top of the tripod. There is limited space in this area, particularly when the legs are deployed in near-vertical positions, and the operator can have difficulty operating the clamp or even suffer bruised knuckles. It also takes a significant time to unscrew the clamp and then re-screw it once the head is levelled, which can make it difficult when there is a heavy camera on the head as this must be balanced by the operator until the clamp is secured. To operate the clamp, the user must reach under the top of the tripod whilst observing the level bubble on the top of the head and balancing the camera on top of the head. This can be awkward, particularly when a heavy camera is being used. Finally, to remove the head from the tripod the clamp nut must be fully unscrewed which can take significant time. Once separate from the tripod, the head has to then be laid on its side as the protruding stud on its bottom prevents it from being stood up on a flat surface, and this can cause damage to the head and also the camera if it remains mounted to the head.

EP2787270 describes a bowl clamp mechanism that addresses some of these issues. Rather than use a clamp nut that must be screwed and unscrewed to operate, this device uses a clamp which is operated by a lever. This makes it easier to operate in the confines of the space under the top of the tripod and makes clamping and un-clamping much quicker to achieve, but the operator must still reach under the top of the tripod between the legs to operate the clamp. The clamp is still screwed onto a stud protruding from the bottom of the head, which means that removing the entire head still takes a significant time and the head will not then stand upright on a level surface because of the stud.

This invention hopes to address the problems described above in the operation of levelling a head whilst still utilising a tripod designed with a bowl clamp feature.

SUMMARY OF THE INVENTION

The present inventive concept provides a head assembly for a tripod comprising a head portion and a bowl portion releasably connectable to one another, the bowl portion having a clamp stud and the head portion having a stud catch mechanism, wherein the stud catch mechanism is adapted to be releasably connectable to the clamp stud, and wherein the head assembly further comprises an adjustment mechanism adapted to adjust the connection between the head portion and the bowl portion when the head portion and bowl portion are connected to one another.

In use the bowl portion may be attached to the tripod and the head portion attached to the head which supports the camera.

The head assembly may have a central axis, which in use may be substantially vertical. In use the head portion may be arranged substantially vertically above the bowl portion—although the reader will appreciate that not every element of the head portion need be above every element of the bowl portion. References to the central axis and relative positions such as up, down, above and below will be understood by the reader in this context.

The bowl portion may comprise a clamp cup with an upwardly facing concave surface, the clamp stud extending substantially vertically upwards from it along the central axis. The clamp stud may comprise a recess. The stud catch mechanism of the head portion may comprise a stud catch plate moveable substantially horizontally into and out of the recess of the clamp stud. The stud catch plate may be engageable by a release lever. Thus, the release lever may be actuated to move the stud catch plate into and out of the recess of the clamp stud to connect and release, respectively, the stud catch plate from the clamp stud. Thus, the head portion can be released or connected to the bowl portion. The release lever may be pivotable about a point of the head portion.

The stud catch plate may alternatively be moveable by other means such as directly by a user, or via a push button or the like.

The head portion may comprise a drag ring having an internal surface and an external surface. The internal surface may comprise one or more indentations wherein each indentation forms a portion of the internal surface having reduced diameter. The external surface may comprise one or more indentations. Indentations of the external surface may provide a gripping surface for a user's fingers.

A portion of the release lever may engage with the internal surface of the drag ring. The release lever may be provided with means adapted to urge the said portion of the release lever against the internal surface of the drag ring. Thus, a rotation of the drag ring around the central axis may cause the said portion of the release lever to be moved by engaging with an indentation during such rotation. In turn, the release lever may move the stud catch plate. Rotation of the drag ring may thus cause the stud catch plate to move into or out of the recess of the clamp stud to connect or release the bowl portion and head portion from one another.

The release lever may alternatively be moved by a button, lever, knob or the like.

The head portion may comprise three release levers arranged approximately equally spaced circumferentially around the head portion.

The adjustment mechanism may have a levelling mode and a fixed mode. When the adjustment mechanism is in the levelling mode, the connection between the head portion and the bowl portion can be adjusted. When the adjustment mechanism is in the fixed mode, the connection between the head portion and the bowl portion substantially cannot be adjusted.

When the adjustment mechanism is in the levelling mode, some relative movement between the head portion and the bowl portion is allowed—while the head portion and bowl portion are connected to one another—so that a user can make small adjustments to the position and/or angle of the head portion relative to the bowl portion. This enables the head portion to be levelled. In the fixed mode, substantially no adjustments are possible.

The head portion may comprise a base portion, a spring and a spring compression plate. The spring may be adapted to urge the base portion and the spring compression plate away from each other vertically. In other words the spring compression plate may be urged upwards by the spring away from the base portion of the head portion.

When the head portion and bowl portion are connected together, with the stud catch plate connected to the clamp stud, an upwardly facing surface of the stud catch plate engages with a downwardly facing surface of the clamp stud, and a downwardly facing surface of the stud catch plate engages with an upwardly facing surface of the spring compression plate. Thus, the spring urges the clamp stud of the bowl portion upwards to bring the head portion and clamp cup closer together.

The spring compression plate may be provided with one or more slots; within which a stud catch plate can move.

Alternatively, the spring compression plate may be adapted to provide a vertical interaction, so that the spring can urge the stud catch plate upwards.

The bowl portion may comprise a bowl shell arranged above the clamp cup; the clamp cup being located at substantially the bottom of the clamp stud. The bowl shell has a portion having a concave upwardly facing upper surface and a corresponding convex downwardly facing lower surface. The convex lower surface of the bowl shell may be adapted to engage with the concave (upper) surface of the clamp cup. Those surfaces—namely the convex lower surface of the bowl shell and the concave surface of the clamp cup—are intended to be shaped to engage with one another. It is desirable to have at least one region of precise correspondence between the lower surface of the bowl shell and the upper surface of the clamp cup. Thus, preferably the clamp cup has an annular surface angled and contoured to substantially precisely correspond to a convex portion of the lower surface of the bowl shell. The bowl shell may have an opening through which the clamp stud may pass. The opening may be large enough to allow the clamp stud to pass but small enough to prevent passage of the lower part of the clamp cup.

It is also desirable to have at least one region of precise correspondence between a lower surface of the base portion of the head portion (sometimes referred to as a half bowl) and an upper surface of the bowl shell. Thus, preferably the upper surface of the bowl shell has at least an annular portion angled and contoured to substantially precisely correspond to a convex portion of the lower surface of the base portion.

The head portion may further comprise a push rod arranged substantially vertically along the central axis and above the spring compression plate, a downwardly facing surface of the push rod being adapted to engage an upwardly facing surface of the spring compression plate. A downward force on the push rod may thus be transferred to the spring compression plate to urge it downwards. Thus, an upward urging of the spring compression plate by the spring can be mitigated by a downward urging by the push rod. The spring may be a disk spring.

In the levelling mode the connection between the head portion and the bowl portion is relaxed, by urging of the push rod downwards. Such a relaxation allows adjustment so the head portion can be levelled when the push rod has a downward force exerted thereon. In other words, the said mitigation may allow a small degree of movement between the head portion and the bowl portion.

The said fixed mode may be engaged by releasing such a downward force on the push rod. The push rod may engage towards an upper end thereof with a cam having an axis of rotation substantially perpendicular to the central axis. Rotation of the cam may thus exert a downward force on the push rod or release such a downward force in dependence on the rotational position of the cam.

The cam may be part of an eccentric shaft. The push rod may comprise a ring formed at substantially an upper end thereof, the ring being adapted to accommodate the cam.

Rotation of the eccentric shaft in turn causes rotation of the cam within the ring to apply or release a downward force on the push rod.

The eccentric shaft may in turn be attached to a handle. The handle and eccentric shaft may be adapted so that when the handle is in an upper position the cam is positioned such that it exerts a downward force on the push rod. The handle and eccentric shaft may be adapted so that when the handle is in a lower position the cam is position such that it substantially does not exert a downward force on the push rod.

Thus, a user can select a levelling mode by moving the handle into an upper position and can select a fixed mode by moving the handle into a lower position.

The adjustment mechanism may alternatively be actuated by any one of a suitable button, lever, knob or rotary means.

The head assembly may further comprise a clamp cup retainer having a sleeve with an internal diameter adapted to receive the clamp stud, wherein a lower portion of the sleeve is of increased external diameter. The external diameter of the lower portion of the sleeve is greater than an internal diameter of the opening of the bowl shell. Thus, the clamp cup retainer is located with its lower portion abutting at least the concave upper surface of the bowl shell. In use, therefore, the clamp cup retainer restricts relative vertical movement between the clamp stud and the bowl shell, so that only relatively small vertical movements are possible. The clamp cup retainer is preferably of resilient flexible material, such as a suitable plastics material. Thus, the clamp cup retainer can be attached to the clamp stud by sliding the clamp cup retainer downwards from the upper end of the clamp stud; a downward force can cause the clamp stud to widen the sleeve sufficiently for the clamp cup retainer to pass downwards. The upper end of the clamp stud may be adapted to restrict upward movement of the clamp stud retainer. For example, the clamp stud may comprise a lip.

The clamp cup retainer thus acts to locate the clamp stud in an axial position while allowing a degree of vertical movement of the clamp stud.

The base of the head portion preferably includes a substantially flat region substantially at a lower end thereof. This enables the head portion, when detached from the bowl portion, to be placed on a flat or approximately flat surface without risking toppling or rolling etc.

The top of the clamp stud may be bevelled. The bottom of the stud catch plate may correspondingly be bevelled. Thus, if the head portion is pushed down onto the clamp stud the stud catch plate may automatically be moved outward and then inward again (for example being urged) so that the stud catch plate may engage in a recess of the clamp stud.

DETAILED DESCRIPTION OF AN EXEMPLARY EMBODIMENT

An exemplary embodiment of the head assembly of the present inventive concept will now be described in reference to the accompanying drawings, in which.

The drawings focus on various components of the exemplary head assembly. In some drawings not every component of the embodiment is explicitly labelled and/or referred to in the accompanying description. However, the reader will appreciate that all of the drawings and the accompanying description set out substantially the same embodiment having substantially the same components. Labelling has been minimised to aid clarity and an absence of a label in a particular drawing should not be taken to imply that a particular component shown or described elsewhere is not present.

Figure 1:
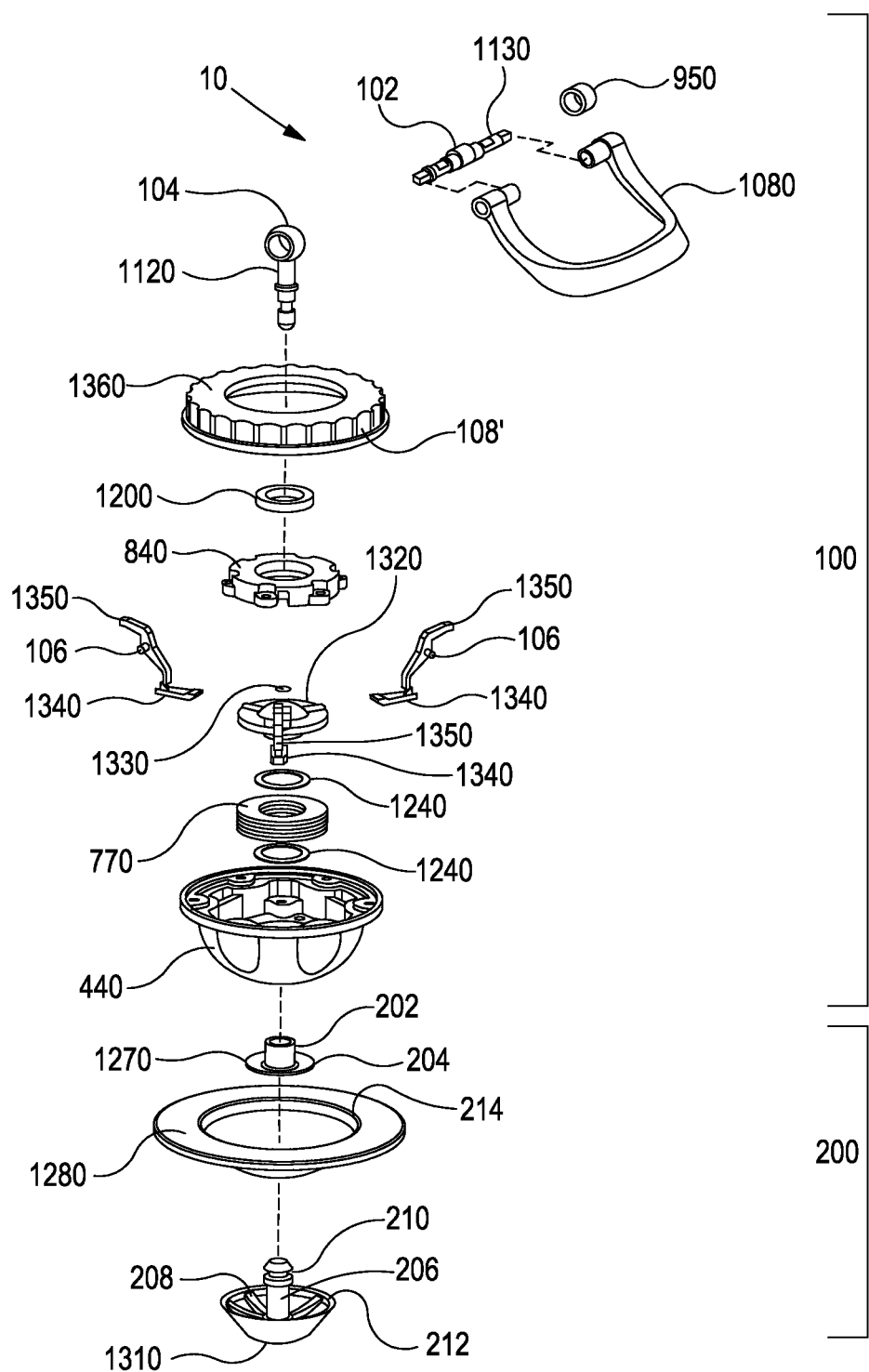
FIG. 1 shows an exploded view of the components of the head assembly.

FIG. 1 shows an exploded view of the components of the head assembly 10. The head assembly 10 has a head portion 100 and a bowl portion 200. The head portion 100 has a handle 1080 attached to eccentric shaft 1130 which has cam 102 located approximately halfway along. Cam 102 is sized and located to fit within ring 104 at the upper end of push rod 1120, so that rotation of cam 102 can exert a force vertically on ring 104 and in turn push rod 1120. Push rod 1120 passes through openings in drag ring 1360, small lower bearing 1200 and bottom bearing retainer 840. Drag ring 1360 is formed with a series of indentations 108' thereon. A lower end of push rod 1120 engages with spring compression plate 1320 via plunger pad 1330. Spring compression plate 1320 has slots formed therein to accommodate and allow movement of three stud catch plates 1340, which are in turn moved by respective stud release levers 1350, each of which has a pivot point 106 around which they can pivot. The spring compression plate 1320 engages with spring 770 below the spring compression plate 1320, via a shim 1240. The lower end of the spring 770 engages a base portion of half bowl 440, again via a shim 1240. Half bowl 440 has a substantially flat region at its base. The bowl portion 200 has a clamp cup retainer 1270 having a sleeve 202 with a lower portion 204 of increased diameter. The clamp cup retainer 1270 is located above and within a concave internal portion of bowl shell 1280. Below the bowl shell 1280 is arranged a clamp cup 1310 having a clamp stud 206 extending vertically from the centre of a concave surface 208. The clamp cup retainer 1270 is of a resilient plastics material and can be slid down over the clamp stud 206 and can form a "snap fit" therewith. The bowl shell 1280 has a hole formed for the clamp stud 206 to pass through. The base portion 204 of the sleeve 202 of the clamp cup retainer 1270 is wider than the opening in the bowl shell 1280, so that the clamp cup retainer 1270 cannot pass through the hole. The clamp cup retainer 1270 thus prevents the clamp stud 206 from passing through the hole in the bowl shell 1280 once the clamp cup retainer has been slid down over the clamp stud 206.

Clamp stud 206 has a recess 210 formed therein for receiving the stud catch plates 1340. The clamp cup 1310 of the bowl portion 200 has an annular surface 212 angled and contoured to substantially precisely correspond to a convex portion of the lower surface of the bowl shell 1280.

The bowl shell 1280 has an annular surface 214 angled and contoured to substantially precisely correspond to a convex portion of the lower surface of the half bowl 440.

The head assembly 10 is arranged along a central axis shown as a dashed line.

Figure 2:
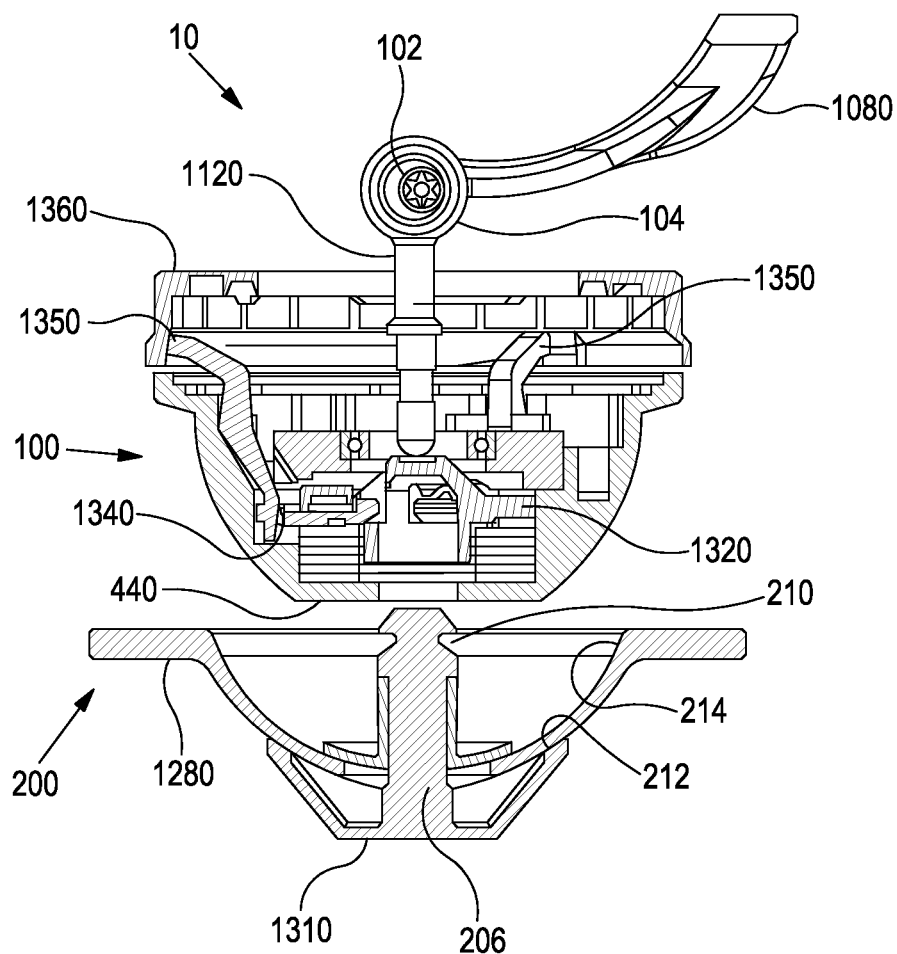
FIG. 2 shows a cross section of the same head assembly with the head portion disconnected from the bowl portion.

FIG. 2 shows a cross section of the same head assembly 10, with the head portion 100 and bowl portion 200 not connected to one another. Drag ring 1360 is in a rotated position such that release levers 1350 are in a position such that stud catch plates 1340 would not engage with the recess 210 of the clamp stud 206 of the bowl portion 200. Handle 1080 is in the upper position, with cam 102 rotated so that it engages with ring 104 of push rod 1120 to exert a downward force on push rod 1120.

Figure 3:
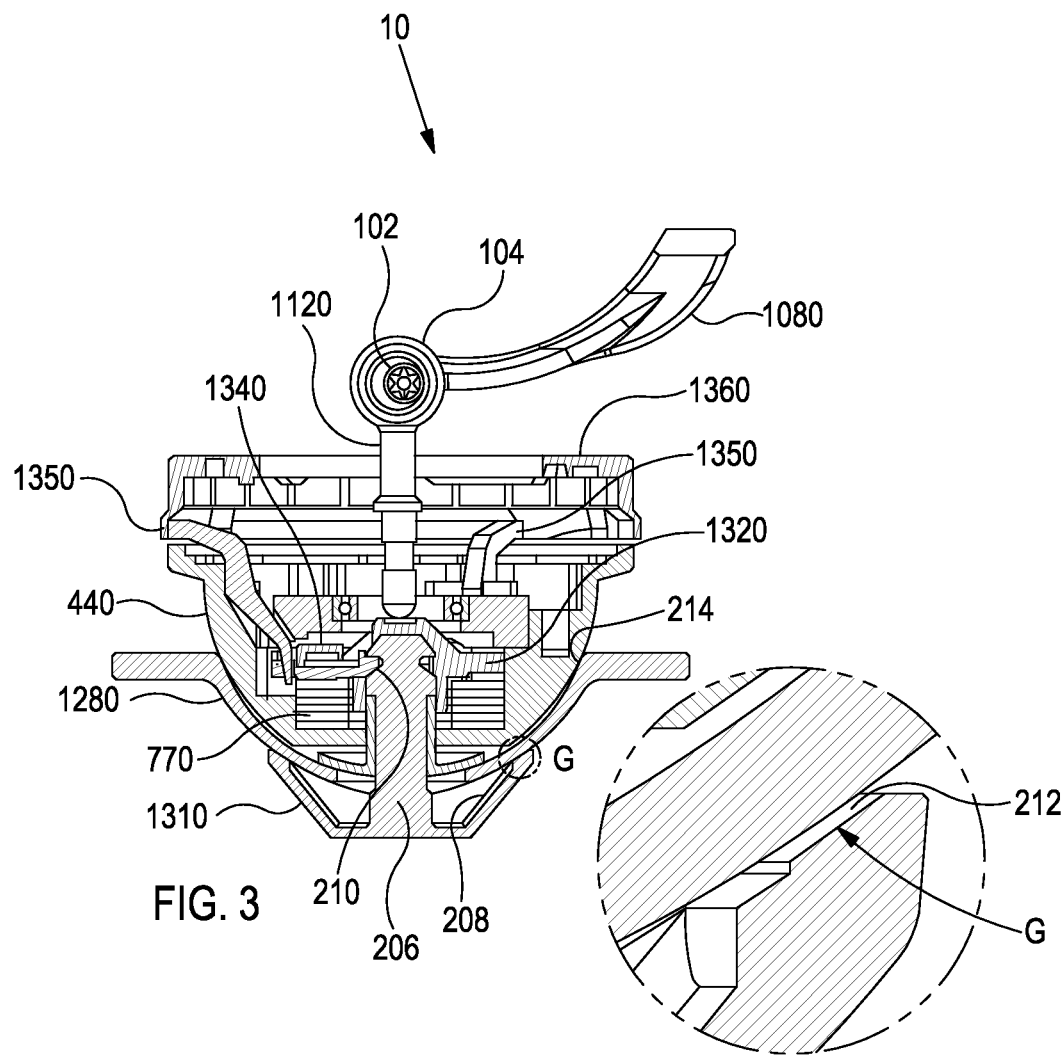
FIG. 3 shows a cross section of the same head assembly with the head portion connected to the bowl portion and the adjustment mechanism in levelling mode.

FIG. 3 shows a cross section of the same head assembly 10, with the head portion 100 and bowl portion 200 connected to one another and the adjustment mechanism in the levelling mode. The bowl portion 200 is positioned vertically partially within the head portion 100. Drag ring 1360 is in a rotated position such that release levers 1350 are in a position such that stud catch plates 1340 are engaged with the recess 210 of the clamp stud 206 of the bowl portion 200. Thus, substantially the head portion 100 and bowl portion 200 are connected to one another. Handle 1080 is in the upper position, with cam 102 rotated so that it engages with ring 104 of push rod 1120 to exert a downward force on push rod 1120. In turn, push rod 1120 exerts a downward force on the spring compression plate 1320 which compresses spring 770 to a small degree. Thus, a small gap G is formed between concave surface 212 of the clamp cup 1310 and the lower surface of the bowl shell 1280. This small gap (shown enlarged in FIG. 3A) allows a small amount of vertical movement between the clamp cup 1310 and the bowl shell 1280 of the bowl portion 200. Thus, the adjustment mechanism is in levelling mode; the head assembly 10 can be levelled by a user.

Figure 4:
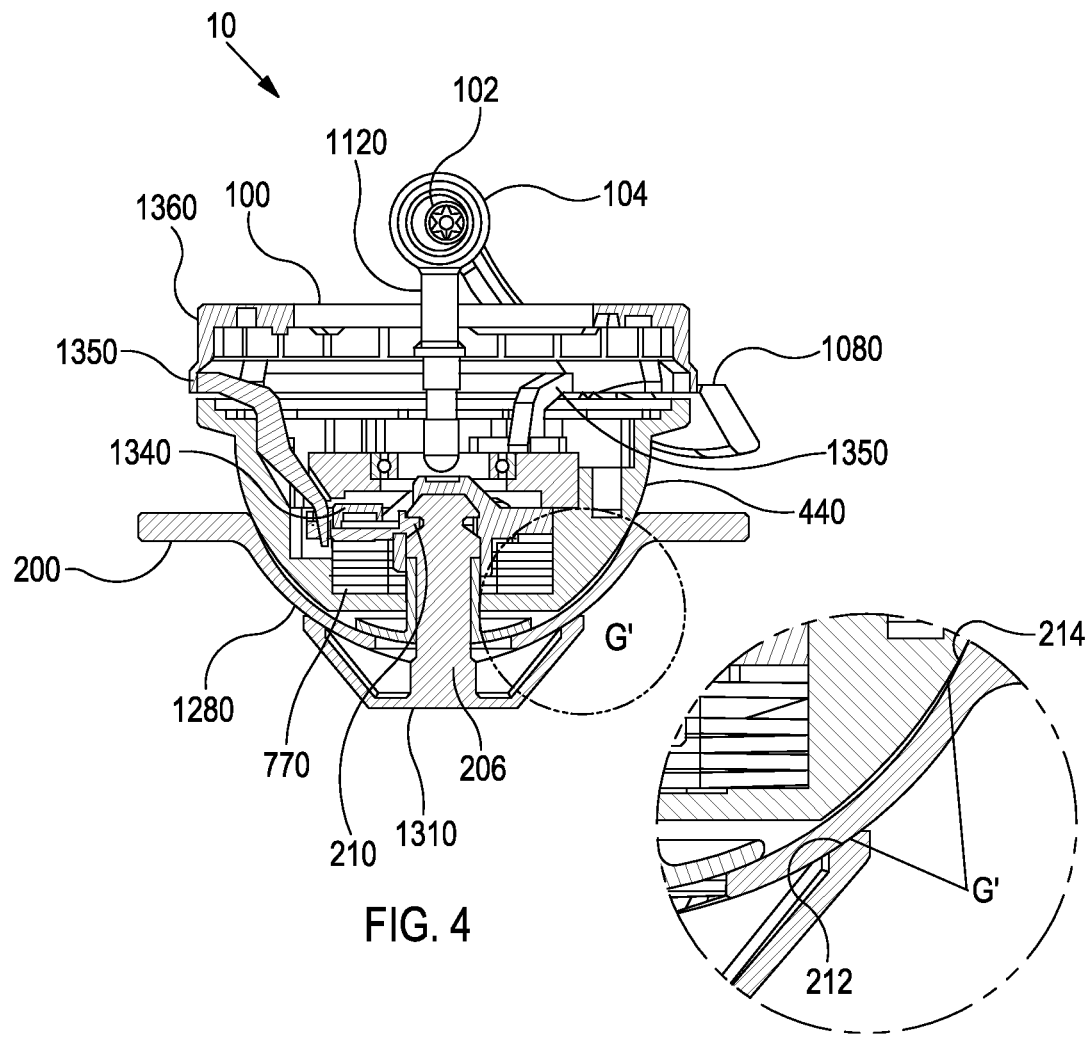
FIG. 4 shows a cross section of the same head assembly with the head portion connected to the bowl portion and the adjustment mechanism in fixed mode.

FIG. 4 shows a cross section of the same head assembly 10, with the head portion 100 and bowl portion 200 connected to one another and the adjustment mechanism in the fixed mode. The bowl portion 200 is positioned vertically partially within the head portion 100. Drag ring 1360 is in a rotated position such that release levers 1350 are in a position such that stud catch plates 1340 are engaged with the recess 210 of the clamp stud 206 of the bowl portion 200. Thus, substantially the head portion 100 and bowl portion 200 are connected to one another. Handle 1080 is in the lower position, with cam 102 rotated so that it substantially is not exerting a downward force on push rod 1120 via ring 104. In turn push rod 1120 is not exerting significant downward force on the spring compression plate 1320, with the result that the clamp stud 206 is urged upward by the spring so that the clamp cup 1310 and the bowl shell 1280 of the bowl portion 200 are held together. Thus, the adjustment mechanism is in fixed mode. In contrast to FIG. 3, there is no gap—illustrated by G' (and shown enlarged in FIG. 4A).

In transition between levelling mode and fixed mode and vice versa, handle 1080 rotates eccentric shaft 1130 and thus cam 102, the rotation of which is adapted to raise/lower pushrod 1120. Pushrod 1120 cooperates with spring compression plate 1320 and thus in turn with spring 770.

Figure 5:
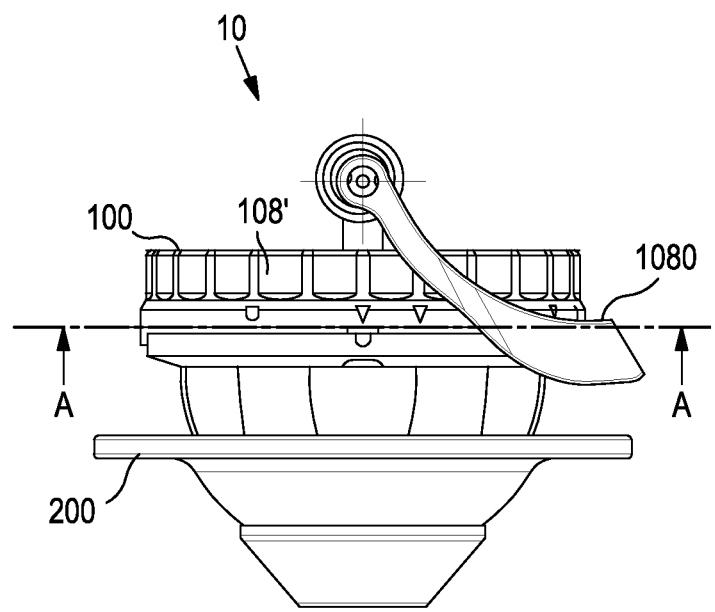
FIG. 5 shows a side view of the same head assembly with the head portion and bowl portion connected together.

FIG. 5 shows a side view of the same head assembly 10 with the head portion 100 and bowl portion 200 connected together and with the handle 1080 in the lower position. Thus, the head assembly 10 is in the fixed mode as shown in FIG. 4 and described above.

The drag ring 1360 has a series of indentations 108' formed circumferentially around an external surface thereof.

Figure 6:
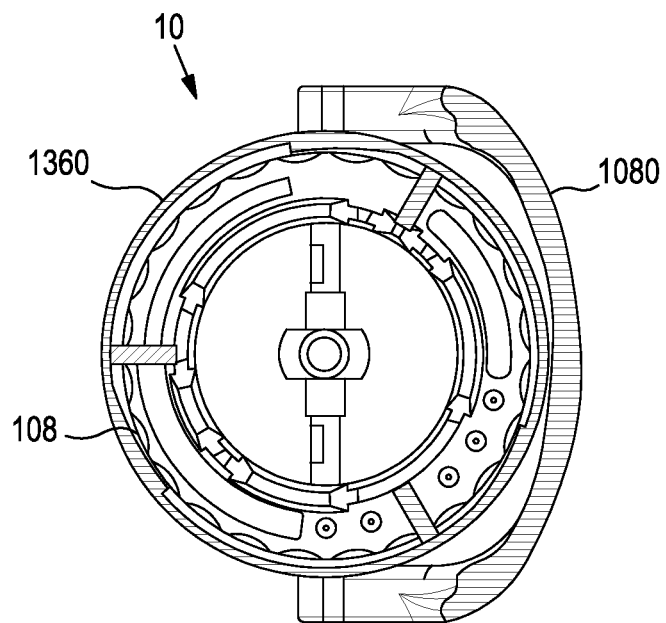
FIG. 6 shows a section along plane A-A shown in FIG. 5.

FIG. 6 shows a section along plane A-A shown in FIG. 5, showing the handle 1080 and drag ring 1360. The drag ring 1360 has a series of indentations 108 formed circumferentially around an internal surface thereof.

The invention claimed is:

1. A head assembly for a tripod comprising a head portion and a bowl portion releasably connectable to one another, the bowl portion having a clamp stud and the head portion having a stud catch mechanism, wherein the stud catch mechanism is adapted to be releasably connectable to the clamp stud, wherein the stud catch mechanism of the head portion comprises a stud catch plate and the clamp stud has a recess formed therein to receive the stud catch plate, and wherein the head assembly further comprises an adjustment mechanism adapted to adjust a connection between the head portion and the bowl portion when the head portion and bowl portion are connected to one another.

2. A head assembly according to claim 1, wherein the bowl portion comprises a clamp cup with an upwardly facing concave surface with the clamp stud extending substantially vertically upwards along the central axis.

3. A head assembly according to claim 1, wherein the stud catch mechanism of the head portion comprises a stud catch plate moveable substantially horizontally into and out of the recess of the clamp stud.

4. A head assembly according to claim 3, wherein the clamp stud and the stud catch plate comprise corresponding bevels.

5. A head assembly according to claim 3, wherein the stud catch plate is engageable by a release lever.

6. A head assembly according to claim 5, wherein the head portion comprises a drag ring having an internal surface and an external surface.

7. A head assembly according to claim 6, wherein the internal surface of the drag ring comprises one or more indentations wherein each indentation to form a portion of the internal surface having reduced diameter.

8. A head assembly according to claim 6, wherein the external surface comprises one or more indentations.

9. A head assembly according to claim 6, wherein a portion of the release lever engages with the internal surface of the drag ring.

10. A head assembly according to claim 9, wherein the release lever is provided with means adapted to urge the said portion of the release lever against the internal surface of the drag ring.

11. A head assembly according to claim 1, wherein the adjustment mechanism has a levelling mode and a fixed mode and wherein when the adjustment mechanism is in the levelling mode, the connection between the head portion and the bowl portion can be adjusted and when the adjustment mechanism is in the fixed mode, the connection between the head portion and the bowl portion substantially cannot be adjusted.

12. A head assembly according to claim 11, wherein the adjustment mechanism is actuated by any one of a handle, button, lever, knob or rotary means.

13. A head assembly according to claim 1, wherein the head portion comprises a base portion, a spring and a spring compression plate.

14. A head assembly according to claim 13, wherein the spring is adapted to urge the base portion and the spring compression plate away from each other vertically.

15. A head assembly according to claim 13, wherein the spring compression plate is provided with one or more slots.

16. A head assembly according to claim 1, wherein the bowl portion comprises a clamp cup and a bowl shell.

17. A head assembly according to claim 16, wherein the clamp cup has an annular portion angled and contoured to substantially precisely correspond to a convex portion of a lower surface of the bowl shell.

18. A head assembly according to claim 16, wherein an upper portion of the bowl shell has an annular portion angled and contoured to substantially precisely correspond to a convex portion of a lower surface of a base portion of the head portion.

19. A head assembly according to claim 1, wherein the head portion further comprises a push rod arranged substantially vertically along the central axis and above the spring compression plate, and wherein a downwardly facing surface of the push rod is adapted to engage an upwardly facing surface of the spring compression plate.

20. A head assembly according to claim 19, wherein the push rod engages towards an upper end thereof with a cam having an axis of rotation substantially perpendicular to the central axis.

21. A head assembly according to claim 1, further comprising a clamp cup retainer having a sleeve with an internal diameter adapted to receive the clamp stud, wherein a base portion of the sleeve is of increased external diameter.

22. A head assembly according to claim 21, wherein the external diameter of the base portion of the sleeve is greater than an internal diameter of an opening of a bowl shell portion.

\* \* \* \* \*